Feb. 6, 1951 — E. M. FOSTER — 2,540,939
LUBRICANT COMPRESSOR
Filed Dec. 20, 1945 — 2 Sheets-Sheet 1
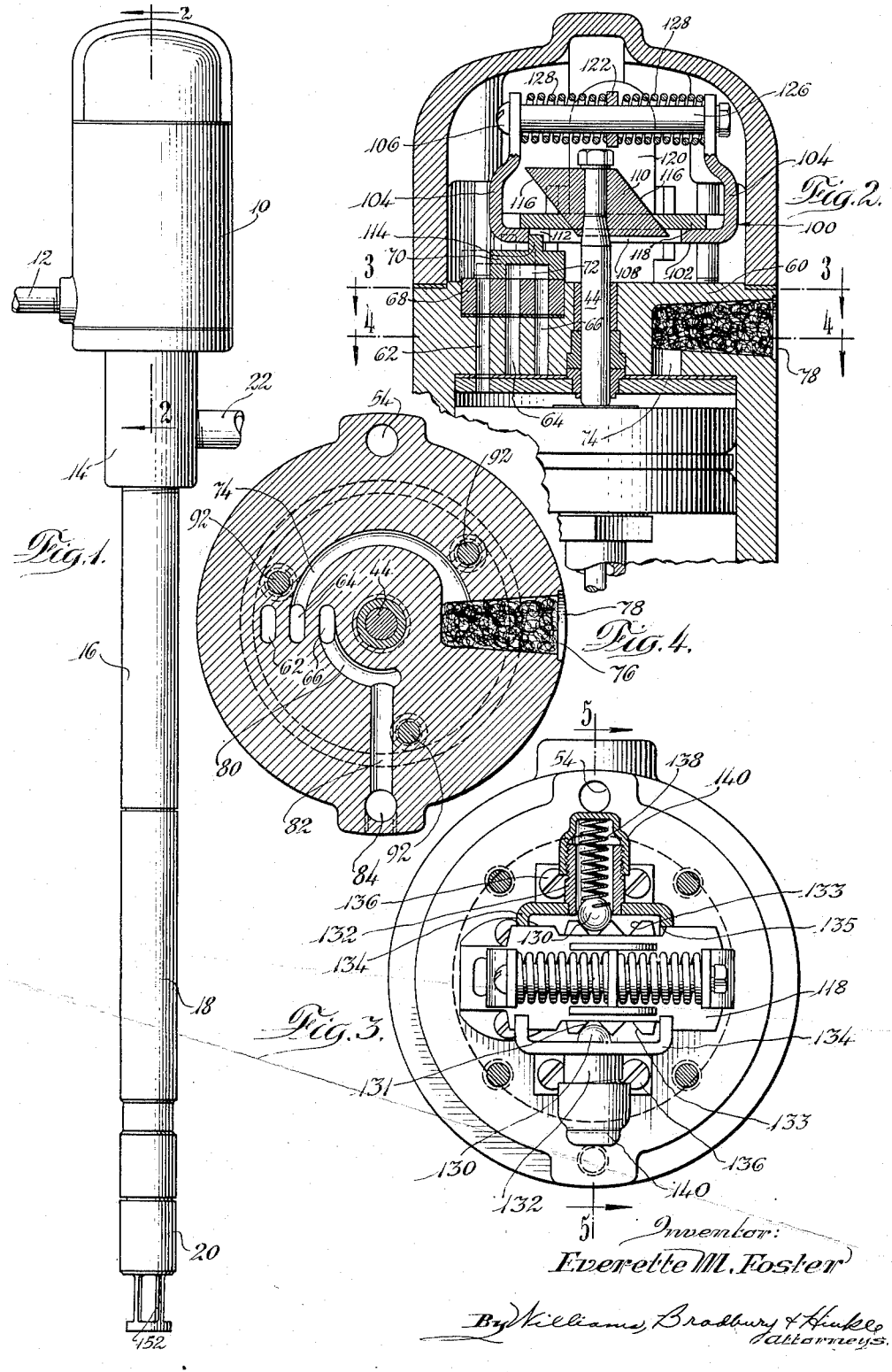
Inventor:
Everette M. Foster
By Williams, Bradbury & Hinkle
Attorneys.

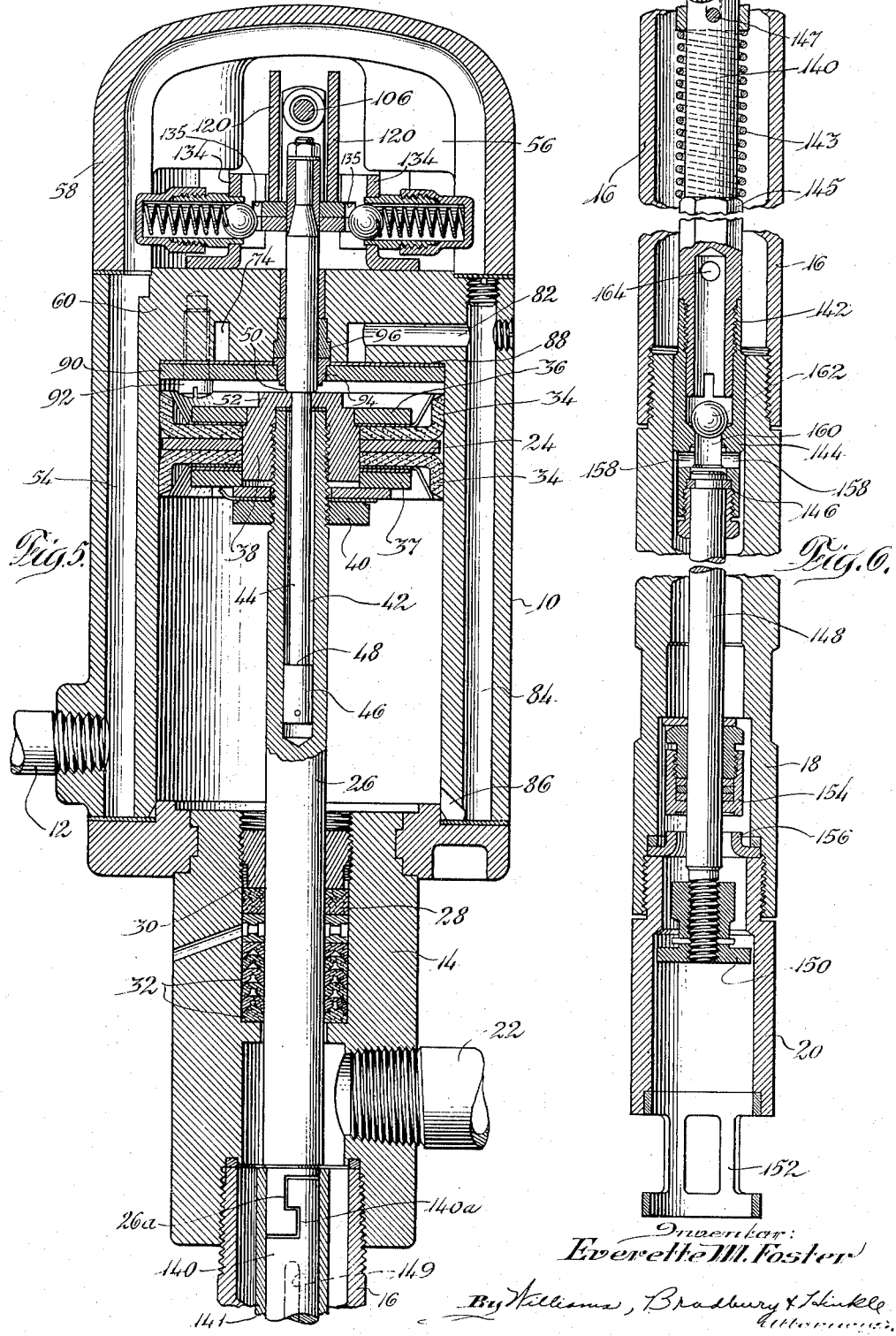

Patented Feb. 6, 1951

2,540,939

UNITED STATES PATENT OFFICE 2,540,939

LUBRICANT COMPRESSOR

Everette M. Foster, Chicago, Ill., assignor to Stewart-Warner Corporation, Chicago, Ill., a corporation of Virginia Application December 20, 1945, Serial No. 636,184

11 Claims. (Cl. 121—164)

This invention relates to a lubricant pumping device of the type in which the pump is suspended in a body of lubricant and is operated by a compressed air motor for elevating the lubricant and discharging it under pressure. Such an arrangement is frequently employed for dispensing heavy grease as well as lubricating oil.

One object of the invention is to provide a new and improved air motor adapted for operating a lubricant pump or compressor.

Another object of the invention is to provide an air motor of reciprocating type with an automatic reversing valve and means for causing the valve to reverse suddenly when actuated by the movement of the motor piston.

It is also an object of the invention to provide a new and improved quick-detachable coupling between the piston of the air motor and the piston of the pump.

Other objects and advantages of the invention will appear from the following description taken in connection with the drawings, in which:

Fig. 1 is a side elevation of a lubricant compressor and air motor therefor as assembled in a combined unit ready for use;

Fig. 2 is a vertical sectional view through the cylinder of the air motor taken as indicated at line 2—2 of Fig. 1;

Fig. 3 is a transverse sectional view taken as indicated at line 3—3 on Fig. 2, and consisting mainly of a plan view of the valve mechanism as it appears when the end cover of the air cylinder is removed;

Fig. 4 is a transverse section taken as indicated at line 4—4 on Fig. 2;

Fig. 5 is a vertical sectional view of the air motor cylinder taken as indicated at line 5—5 on Fig. 3 and including the upper end of the pump rod and its connection to the piston rod of the air motor;

Fig. 6 is a vertical sectional view in the same plane as Fig. 5 and showing the lubricant pumping mechanism.

In the assembly illustrated in Fig. 1, the air motor cylinder 10 is shown with an air supply pipe 12 leading into one side, and with a hollow stem portion 14 interposed between the cylinder 10 and the tubular casing 16 of the lubricant pump. The pump cylinder 18 extends from the lower end of the tubing 16 and there is attached to it a lubricant inlet fitting 20 at the lower end. The operation of the pump lifts the lubricant through the inlet fitting 20 and through the casing 16, and discharges it through a pipe 22 at one side of the connecting stem 14, any suitable hose or other conduit being attached to the pipe 22 for conveying the lubricant to a point of use.

Within the cylinder 10 a piston 24 is mounted for reciprocation and has rigidly connected with it a piston rod 26 which is slidable in the stem 14, as seen in Fig. 5. Said stem contains suitable packing 28 secured by a gland 30 to prevent leakage of air along the piston rod 26 and which also is provided with additional packing at 32 to prevent the leakage of lubricant upwardly from the casing 16 along the piston rod 26. In addition to the disc or plate 24 the piston assembly includes the cup washers 34, 34 with their retaining plates 36 and 37, all secured around a central core or hub 38 which is screwed onto the threaded upper end of the piston rod 26 and secured in any suitable manner as by a lock nut 40.

The upper end of the piston rod 26 is hollow, providing a bore 42 in which a valve rod 44 is accommodated for axial movement. The lower end of the valve rod includes a head portion 46 providing an upwardly facing shoulder 48, and the upper portion of the valve rod is larger than the lower portion, thus providing a downwardly facing shoulder 50. The hub portion 38 of the piston is formed with a central opening in its end wall 52 and this opening is just large enough to accommodate the smaller portion of the valve rod 44 so that the shoulders 48 and 50 of the valve rod are engaged alternately by the opposing surfaces of the end wall 52 of the hub 38 as the piston reciprocates. The distance between the shoulders 48 and 50 is only slightly less than the full stroke of the piston, so that the valve rod 44 provides a lost motion connection between the piston and the valve mechanism about to be described.

From Fig. 5 it will be seen that the air inlet pipe 12 admits air under pressure to a passage 54 extending upwardly in the wall of the cylinder 10 and opening into a valve chamber 56 which is provided by the dome or end cap 58 secured to the upper end of the cylinder in airtight relation thereto. As seen in Fig. 2, the cylinder head or end wall 60 is formed with the three ports 62, 64, and 66 which are continued upwardly through a valve plate 68 in contact with which a slide valve 70 is arranged for actuation. The cylinder 10 and its head 60 are preferably of cast construction and the valve plate 68 is merely employed as a convenience in manufacture, so that it can be conveniently machined and will provide a suitable wear-resisting surface for engagement with the slide valve 70.

The port 62 leads directly from the valve chamber 56 into the upper end of the cylinder 10, so that when this port is uncovered, as shown in Fig. 2, the air pressure is applied to the upper side of the piston 24 for moving it downwardly. When the valve 70 is shifted to the position shown in dotted lines in Fig. 2, its cavity 72 forms a connection between the port 62 and the port 64. As seen in Fig. 4, the port 64 is connected by a passage 74 with the exhaust opening 76 which may be filled with steel or copper wool or similar material and covered with a suitable perforated plate or screen 78. Thus, any pressure in the cylinder above the piston 24 is released to the atmosphere and the air remaining in this space will not obstruct the upward movement of the piston. With the slide valve 70 in the position shown in dotted lines in Fig. 2, the port 66 is opened directly to the valve chamber 56. Since this port is connected by passages 80, 82, 84 and 86 with the lower end of the cylinder 10 below the piston 24, air under pressure is thus admitted below the piston for the upstroke thereof, and during upward movement of the piston the air escapes from the upper portion of the cylinder 10 through the ports 62 and 64 which are connected by the cavity 72 of the valve 70 at this time.

For convenience of construction, the passages 74 and 80 may be cored in the under side of the cylinder head 60 and then closed by a sheet of packing material 88 and a cover plate 90 secured in the upper end of the cylinder by screws 92. The plate 90 holds in place a gland member 94 which retains a bushing 96 of packing material which surrounds the valve rod 44 and thus provides a seal against air leakage along the rod.

The actuation of the slide valve 70 is accomplished by the movement of a frame or crosshead 100 which comprises a base portion 102 with arms 104 extending upwardly from its opposite ends and connected by a tie bolt 106. The base 102 has a longitudinal slot 108 providing clearance for the upper end of the valve rod 44 and a cam plate 110 attached thereto, and the sides of the slot 108 are provided with notches 112 which engage an upstanding lug 114 on the slide valve 70 for transmitting movement from the crosshead 100 to the valve 70. The inclined cam faces 116 of the plate 110 engage the ends of a fitted slot in a follower plate 118, as seen in Fig. 2, so that vertical movement of the valve rod 44 and the cam plate 110 causes transversely horizontal movement of the follower plate 118. The follower 118 includes upstanding arms 120 which straddle the bolt 106 of the crosshead 100, as seen in Fig. 5, and the arms 120 are connected by a crossbar 122 having a central opening to accommodate the bolt 106. Preferably, the bolt is covered by a sleeve 126 which is slidable smoothly through the opening in the crossbar 122. Coil springs 128, 128 react between opposite sides of the crossbar 122 and the arms 104 of the crosshead 100. Thus the horizontal movement of the follower 118 caused by vertical movement of the cam plate 110 shifts the crossbar 122 in a direction to compress one of the springs 128 until sufficient pressure is built up to move the crosshead 100 bodily and shift the valve 70 in the direction in which the follower 118 has been moved by the cam plate 110. Movement of the cam plate 110 in the opposite direction produces a corresponding movement of the follower 118 causing the crossbar 122 to compress the other spring 128 and shift the crosshead 100 back to its original position, the crosshead carrying with it the slide valve 70.

These movements of the crosshead 100 are yieldingly resisted by spring-pressed detent balls 130 engaging in V-shaped notches 131 in the base portion 102 of the crosshead 100. The balls 130 are carried in pockets 132 mounted in brackets 134 which are secured to the cylinder head 60 by screws 136, and the pockets house springs 138 confined by caps 140 forming the outer ends of the pockets. Notches 135 in the brackets 134 form guideways for the crosshead and the follower. When the cam plate 110 begins to move the follower 118, the detent balls 130 at first prevent any corresponding movement of the crosshead 100 and continue to hold it stationary until the follower 118 and its crossbar 122 have moved far enough to build up sufficient pressure in one of the springs 128 to overcome the yielding resistance of the detents 130. The crosshead 100 then will move suddenly to the limit of its range, causing the detent balls 130 to be forced out of the notches 131 which they first occupy, and to immeditely snap into the notches 133 to hold the crosshead at said other limit of its range until reverse action of the cam 110 operates to return it to its initial position.

In view of the lost motion involved in the connection between the valve rod 44 and the piston 24 and its piston rod 26, the movements of the valve rod 44 will take place only as the piston 24 approaches either end of its stroke and then, as just described, the final shifting of the valve 70 will be delayed during completion of the piston stroke and while sufficient pressure is being built up in one or the other of the springs 128 to shift the crosshead 100 and the valve 70. Thus the working pressure of the air will be allowed to operate against the piston through a maximum portion of its stroke, and then will be applied in full force for reversing the piston movement as quickly as possible whereby the lubricant pump will be operated at maximum pressure in an almost continuous manner.

The construction of the pump shown in Figs. 5 and 6 is largely conventional. The pump rod 140 has a threaded connection 142 with the piston or plunger 144. The reduced lower end portion 146 of the piston has coupled to it a second rod 148 threaded at its lower end to receive a head 150. The hollow terminal fitting 20 attached to the lower end of the pump cylinder 18 has a bore in which the head 150 reciprocates freely and carries a cage-like guide 152 through which the head 150 is reciprocated by the movement of the pump piston 144. The head 150 thus picks up lubricant which flows into the cage 152 and carries it upwardly through the bore of the pipe 20 and into the lower portion of the cylinder 18. This lubricant is thus moved past the foot valve 154 and is trapped in the cylinder 18 as the valve closes downwardly against its seat 156. Downward movement of the piston or plunger 144 transfers the lubricant through lateral ports 158 and a central passage 160 in the piston past a check valve 162 and through a port 164 into the casing 16, so that on the upstroke the piston lifts the lubricant through the casing 16 for discharge by way of the outlet pipe 22.

To permit convenient disconnection of the air motor from the pump, the piston rod 26 and the pump rod 140 are provided with a quick-detachable coupling. The lower end of the piston rod 26 is cut away at one side and then notched at 26a, and the upper end of the rod 140 is similarly cut away at one side and notched at 140a. The hook-shaped ends of the rods thus formed are lapped and interengaged as seen in Fig. 5, and they are held in this relation by a sleeve 141 which is held in position by a spring 143 coiled about the rod 140. A hexagonal portion 145 of the rod 140 provides a shoulder against which the spring 143 is stopped. When the stem portion 14 of the air motor has been unscrewed from the upper end of the casing 16, the sleeve 141 may be pushed downward, compressing the spring 143 and releasing the hooked ends of the rods 26 and 140 so that they can be separated laterally. A cross pin 147 in the rod 140 engages the slots 149 in the sleeve 141 to limit the upward return movement of the sleeve.

While there is shown and described herein certain structure illustrating the invention, it is to be understood that the invention is not limited thereto or thereby but may assume numerous other forms and includes all modifications, variations and equivalents coming within the scope of the following claims.

I claim:

1. In an air motor including a cylinder, a piston, and a slide valve for controlling the admission of air under pressure alternately to opposite ends of the cylinder, means to actuate said valve including a slotted follower plate slidably mounted for movement transversely of the direction of piston travel and connected to said valve, a valve actuating rod extending through the head of the cylinder and movable longitudinally by the piston travel, and a cam carried by said rod and extending through said slotted plate, said cam having parallelly inclined opposite surfaces in engagement with opposite ends of said slot in the follower of the plate for shifting said plate as the valve rod is actuated by the travel of the piston.

2. In an air motor as defined in claim 1, said rod having oppositely facing shoulders spaced apart and engageable respectively with abutment means on the piston, but with lost motion, for shifting the valve as the piston approaches either limit of its reciprocation in the cylinder.

3. In an air motor including a cylinder, a piston, and a slide valve for controlling the admission of air under pressure alternately to opposite ends of the cylinder, means to actuate said valve including a crosshead connected thereto and movable parallel to the path of valve travel, a member movable parallel to said crosshead movement in response to movement of the piston, spring means interposed between said member and the crosshead, means yieldingly opposing movement of the crosshead and serving to delay its movement in either direction until said spring means has been stressed by the travel of said member, said slide valve being movable transversely of the direction of piston travel, a cam operated by the movement of the piston and having surfaces inclined to its direction of movement, the aforesaid member which transmits movement to the crosshead comprising follower means engaging the cam whereby said member and crosshead and slide valve are actuated by the movement of the piston.

4. In an air motor including a cylinder, a piston, and a slide valve for controlling the admission of air under pressure alternately to opposite ends of the cylinder, means to actuate said valve including a crosshead connected thereto and movable parallel to the path of valve travel, said crosshead having a pair of spaced upstanding arms, a tie rod connecting said arms with a pair of coil springs on said tie rod, a slotted follower plate slidable on the crosshead with arms upstanding therefrom at opposite sides of said tie rod and abutment means carried by said arms between the opposing ends of said springs, a valve rod extending through the head of the cylinder and movable longitudinally by the piston travel, a cam plate on said rod having inclined surfaces respectively engaging opposite ends of the slot in said follower plate, and detent means yieldingly resisting movement of the crosshead to cause a snap action of the crosshead and valve when the movement of the follower has tensioned one of said springs sufficiently to overcome the resistance of said detent means.

5. In an air motor as defined in claim 4, said crosshead including a base portion with a pair of notches formed in each side thereof, and said detent means comprising a spring-pressed ball disposed at each side of the crosshead in position to engage any one of said notches at one limit of the crosshead movement and to engage in the other notch when the crosshead is shifted to its other limit.

6. In an air motor including a cylinder, a piston, and a slide valve for controlling the admission of air under pressure alternately to opposite ends of the cylinder, means to actuate said valve including a crosshead connected thereto and movable parallel to the path of valve travel, said crosshead having a pair of spaced upstanding arms, a tie rod connecting said arms with a pair of coil springs on said tie rod, a member engaged between opposing ends of said coil springs, means actuated by the piston for moving said member in the direction to compress one of said springs as the piston approaches one limit of its travel and moving said member in the other direction to compress the other spring as the piston approaches its opposite limit of travel, and means yieldingly resisting movement of the crosshead in either direction, said yielding means operating to release the crosshead suddenly upon accumulation of sufficient spring pressure, thereby causing the valve to be shifted suddenly for reversing the piston.

7. In an air motor as defined in claim 6, said piston actuated means for moving said member including a valve rod extending slidably through the head of the cylinder and through the piston, said rod having oppositely facing shoulders spaced apart and engageable respectively with abutment means on the piston, but with lost motion, for shifting said member, and a hollow piston rod accommodating said valve rod.

8. In a mechanism for operating a valve to control the application of fluid pressure to the opposite sides of a piston, the combination comprising a valve, a crosshead connected to operate said valve, spring means operatively engaged with said crosshead, means movable in opposite directions and relative to said crosshead to condition the spring means alternately to move said crosshead in opposite directions, yieldable means for restraining movement of said crosshead until a predetermined force is exerted by said spring means sufficient to cause movement of the crosshead with a snap action, cam means movable in response to movement of said piston for moving the movable means linearly in opposite directions normal to the direction of movement of the cam means thereby to condition the spring means for moving the crosshead, and lost motion means for moving said cam means in opposite directions in response to movement of the piston as the latter approaches either limit in its stroke.

9. A valve actuator as set forth in claim 8, wherein the yieldable restraining means comprises notched latch means and a spring pressed detent adapted to cooperate therewith to restrain movement of said crosshead, one of said cooperating means being carried by said crosshead and the other being fixed against movement.

10. In a mechanism for operating a valve to control the application of fluid pressure to the opposite sides of a piston, the combination comprising a valve for controlling the flow of said fluid, a crosshead connected to operate said valve, spring means operatively engaged with said crosshead, means movable in opposite directions and relative to said crosshead to condition the spring means alternately to move said crosshead in opposite directions, yieldable means for restraining movement of said crosshead until a predetermined force is exerted by said spring means sufficient to cause movement of the crosshead with a snap action, and cam means movable in response to the approach of said piston to either limit of its stroke having opposite parallel cam faces inclined to a direction of movement of the cam and adapted to cooperate with correspondingly inclined faces on said movable means to move the latter linearly in opposite directions normal to the direction of movement of the cam means thereby to condition the spring means for moving the crosshead.

11. In an air motor, a cylinder, a double acting piston therein having a piston rod extending through one end of the cylinder, a head on the other end of said cylinder having a first port extending therethrough into the adjacent end of said cylinder, and a plurality of open cored recesses on its inner side, a closure member in said cylinder for closing said cored recesses to define passageways in said head including a passageway adapted to be connected to the opposite side of said cylinder and a passageway forming an exhaust outlet, two ports on the outer side of said head communicating respectively with said exhaust passageway and the passageway adapted to be connected to the other side of said cylinder and aligned with said first mentioned port, a valve for alternately exposing the ports in said head connected to the opposite ends of said cylinder and connecting the same with the port communicating with said exhaust passageway, snap action mechanism for shifting said valve to establish the communication aforementioned, lost motion means for operating said snap action means from said piston as the latter approaches either limit of its stroke to reverse the application of fluid pressure to said piston, a hollow cap on said cylinder head enclosing said operating mechanism and forming an inlet chamber for the motivating fluid, and means for supplying motivated fluid under pressure to said hollow cap.

EVERETTE M. FOSTER.

REFERENCES CITED

The following references are of record in the file of this patent:

UNITED STATES PATENTS

| Number | Name | Date |
| --- | --- | --- |
| 1,372,905 | Renfro | Mar. 29, 1921 |
| 2,122,020 | Barks | June 28, 1938 |
| 2,215,852 | Klein | Sept. 24, 1940 |
| 2,258,493 | Hull | Oct. 7, 1941 |
| 2,294,705 | Wedeberg | Sept. 1, 1942 |
| 2,433,759 | Hess | Dec. 30, 1947 |

FOREIGN PATENTS

| Number | Country | Date |
| --- | --- | --- |
| 19,696 | Great Britain | Aug. 28, 1912 |
| 63,691 | Sweden | Sept. 13, 1927 |